United States Patent [19]
Eslambolchi

[11] Patent Number: 5,870,032
[45] Date of Patent: Feb. 9, 1999

[54] RESTORATION NETWORK ARCHITECTURE

[75] Inventor: Hossein Eslambolchi, Basking Ridge, N.J.

[73] Assignee: AT&T Corp, Middletown, N.J.

[21] Appl. No.: 787,785

[22] Filed: Jan. 23, 1997

[51] Int. Cl.$^6$ .............................. H04B 3/38; G01R 31/08; H04L 12/50

[52] U.S. Cl. ........................... 340/827; 370/384; 370/216

[58] Field of Search ................................... 370/216, 228, 370/225, 381, 384, 524; 340/825.01, 825.03, 827, 825.79; 375/260, 267; 455/8; 395/182.02, 575; 371/68.2, 11.2

[56] References Cited

U.S. PATENT DOCUMENTS

| | | | |
|---|---|---|---|
| 5,235,599 | 8/1993 | Nishimura et al. | 340/827 |
| 5,444,583 | 8/1995 | Arslan et al. | 370/221 |
| 5,463,615 | 10/1995 | Steinhorn | 370/221 |
| 5,495,471 | 2/1996 | Chow et al. | 340/827 |
| 5,621,722 | 4/1997 | Edmaier et al. | 340/827 |
| 5,625,478 | 4/1997 | Doerr et al. | 340/827 |
| 5,646,936 | 7/1997 | Shah et al. | 340/827 |

*Primary Examiner*—Brian Zimmerman
*Assistant Examiner*—Jean B. Jeanglaude
*Attorney, Agent, or Firm*—Robert B. Levy

[57] ABSTRACT

A network (100) capable of quickly restoring traffic includes main and tertiary communications media (103, 105), each having associated main channels ($102_1$–$102_n$) and tertiary channels ($104_1$–$104_m$), respectively. A first main channel ($102_1$) and first tertiary channel ($104_1$) run in parallel between a pair of digital signal protection switches ($106_1$–$106_2$) coupled to a pair of digital cross-connect systems ($108_1$, 116) that are spanned by the remaining main channels ($102_2$–$102_n$) and tertiary channels ($104_2$–$104_m$) in parallel. A controller 120 is responsive to the traffic on the main communications medium for signaling the first and second digital protection switches ($106_1$, $106_2$) to switch traffic from the first main channel ($102_1$) to the first tertiary channel ($104_1$) should the first main channel become unavailable. The controller also subsequently signals the first and second digital cross-connect devices, which switch slower than the digital signal protection switches, to switch traffic from one or more of the other main channels to corresponding tertiary channels should such main channels become unavailable.

15 Claims, 2 Drawing Sheets

RESTORATION NETWORK ARCHITECTURE

TECHNICAL FIELD

This invention relates to an architecture for a telecommunications network that provides rapid restoration of traffic in the event a communications path within the network becomes unavailable.

BACKGROUND OF THE INVENTION

Present day networks, especially those carrying telecommunications traffic, often employ different types of communications media to carry information between an origin and a destination. For example, within the AT&T telecommunications network, fiber optic cables, copper cables, satellites and microwave stations collectively carry telecommunications traffic. In some instances, a telecommunication network may employ two different types of communications media in parallel between a pair of network nodes to allow traffic to be routed from one medium to another should one become unavailable because of a disruption or a lack of transport capacity. For example, within the AT&T network telecommunications, both an undersea fiber optic cable and a satellite link exist between Alaska and the continental United States. Thus, in theory, traffic that cannot pass on the undersea cable because of a disruption could be routed via satellite, avoiding blocked calls.

In practice, traffic restoration via satellite is usually not instantaneous. In many instances, the satellite may already be carrying traffic on an assigned transponder frequency. Thus, additional transponders may be necessary to carry the traffic unable to pass via the undersea cable. Assuming such transponders are even available, their use often requires re-orientation of the uplink and/or downlink earth stations which may take time, resulting in blocked calls. Often, restoration of full traffic occurs only after repair of the cable which may take days, even weeks to complete.

Thus, there is a need for a telecommunications network architecture that facilitates rapid restoration.

BRIEF SUMMARY OF THE INVENTION

Briefly, in accordance with the invention, there is provided a telecommunications network that provides fast traffic restoration. The network includes a plurality of main communications channels that collectively comprise a main communications medium. The network further includes a plurality of tertiary (restoration) channels that collectively comprise a tertiary communications medium. For example, the main channels may comprise separate multiplexed time slots on one or more fibers within an optical fiber cable. The tertiary channels may comprise transponder channels associated with a satellite. A first one of the main channels and a first one of the tertiary channels run parallel to each other between a first and second protection switching devices, e.g., first and second digital signal protection switches. The first and second protection switching devices are coupled to first and second cross-connect devices, respectively, connected to first and second telecommunications switches, respectively. The first tertiary channel remains active (along with the other tertiary channels) but typically does not carry normal (service), Thus, the first tertiary channel serves as a restoration path to permit traffic on the first main channel to be diverted thereto should the first main channel become unavailable.

The first and second switching devices, along with the first and second cross-connect devices, are controlled by a controller responsive to the traffic carried on the first main and first tertiary channels. Should the first main channel become unavailable, then the controller signals the first and second protection switching devices to rapidly switch traffic from the first main channel to the first tertiary channel, allowing for rapid restoration of at least some of the traffic carried by the main communications medium. The other main channels and the other tertiary channels run in parallel between the first and second cross-connect devices. Should any of the main channels other than the first one become unavailable, then the controller signals the first and second cross-connect devices, which switch at a rate slower than the first and second protection switching devices, to switch traffic from one or more of the other main channels onto at least one of tertiary channels other than the first one.

The advantage of the above-described network is its ability to rapidly restore at least a portion of the traffic carried on the first main communication medium channel by switching such traffic automatically, in a nearly instantaneous manner, onto the first tertiary channel via the first and second protection switching means. Traffic on the other main channels can be routed via the slower-reacting digital cross-connect devices to the other tertiary channels should additional capacity be necessary.

DETAILED DESCRIPTION

Figure 1:
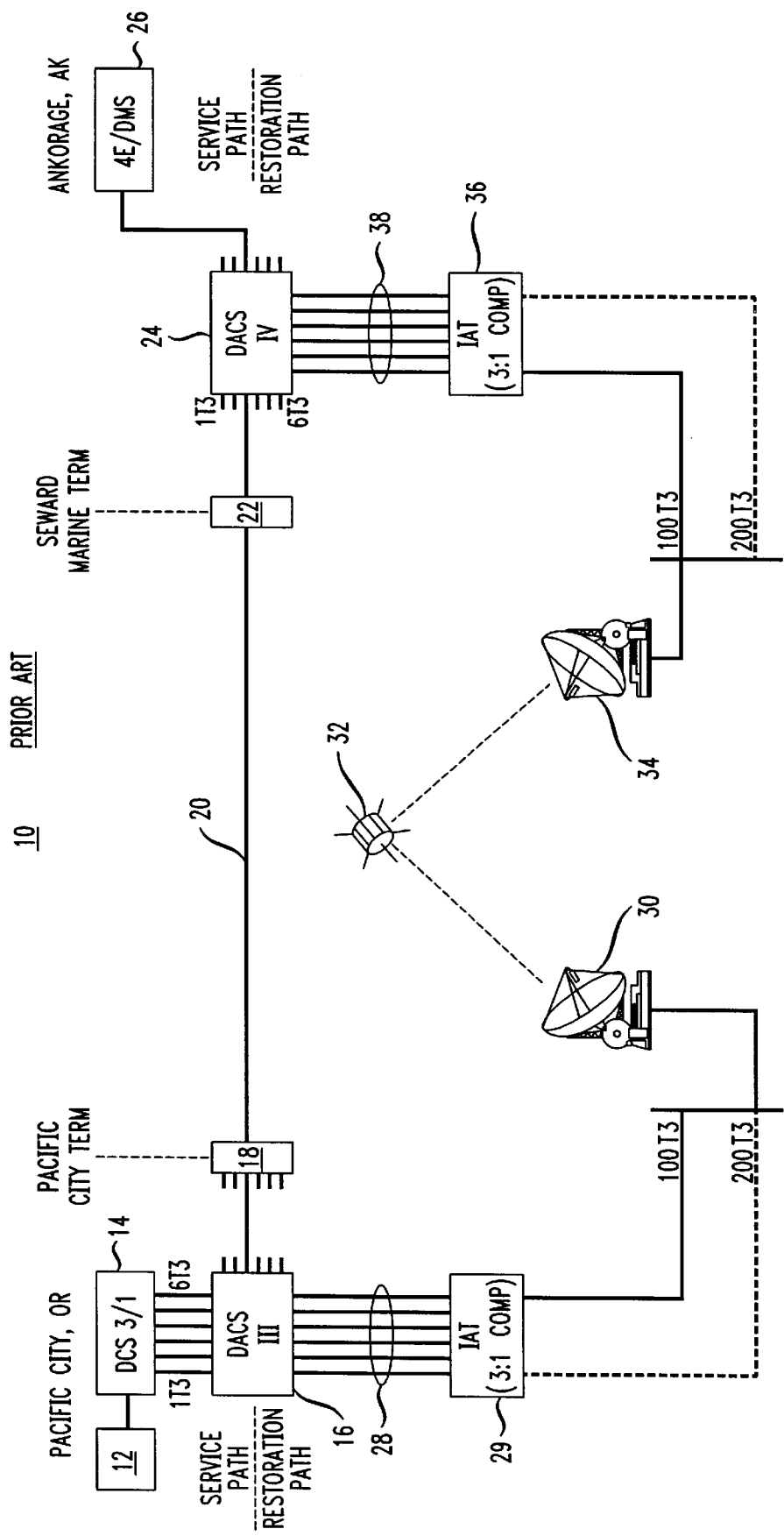
FIG. 1 is a block schematic diagram of a prior art telecommunications network.

FIG. 1 illustrates a block schematic diagram of a prior art telecommunications network 10 depicting the network presently employed by AT&T to provide telecommunications services between Pacific City, Ore. and Anchorage Ak. At Pacific City, Ore., a first toll switch 12, typically a number 4ESS switch formerly manufactured by AT&T, feeds originating traffic to (or receives terminating traffic from) a first Digital Compression System (DCS) 14. The DCS 14 provides 3:1 compression of signals that pass from the switch 12 to a first Digital Cross-Connect (DACS) System 16 and 1:3 decompression of signals passing from the DACS 16 to the switch.

The DACS 16 provides a cross-connection between the signal paths associated with the first DCS 14 and a set of channels of a first terminal 18 located at Pacific City, Ore. The first terminal 18 terminates one end of a multi-channel undersea cable 20 whose opposite end terminates at a second terminal 22 located at Seaward, Ak. A second DACS 18 cross-connects the channels of the cable 20 that terminate at the second terminal 22 to a telecommunications switch 26, also typically a 4ESS switch located at Anchorage, Ak.

The DACS 16 also connects the channels of the DCS 14 via a set of paths 28 (typically T3 trunks) to a first Integrated Access Terminal (IAT) 29 that provides 3:1 compression for traffic passing from the DACS 16 to a first earth station 30 located within the Continental United States. (By the same token, the IAT 29 provides 1:3 decompression for the signals received from the earth station 30 that pass to the DACS 16.). The earth station 30 transmits signals to, and receives signals from a satellite 32 that also sends signals to, and receives signals from, a second earth station 34 located in Alaska. In this way, traffic can pass via the satellite 32 between the earth stations 30 and 34 in the continental United States and Alaska, respectively.

The earth station 32 is coupled to a second IAT 36 that is linked via a set of channels 38 (typically T3 links) to the DACS 24. Like the IAT 29, the IAT 39 provides 3:1 compression of transmitted traffic from the DACS 24 to the earth station 34, and 1:3 decompression of the traffic from the earth station to the DACS.

The channels of the cable 20 that connect the DACS 16 and the DACS 24 are designated in FIG. 1 as the service path because the channels of the cable carry normal (service) traffic. By contrast, the communication path provided via the trunks 28, the satellite 32 and the trunks 38 is generally referred to as the restoration path because traffic is only carried on this path when the service path is unavailable. Such unavailability may occur when there is a disruption on the service path, or when the service path is already at capacity.

Restoration of a broken communication path within the network 10 of FIG. 1 is generally a manually operation. When an outage of cable 20 occurs, technicians signal the DACS 16 and 24 to switch traffic from each channel of the cable that is unavailable to an associated transponder channel on the satellite 32. Depending on the transponder channels that are available on the satellite, it may be necessary for technicians at either or both of the earth stations 30 and 34 to re-orient their earth station antenna, preventing timely restoration of traffic.

Figure 2:
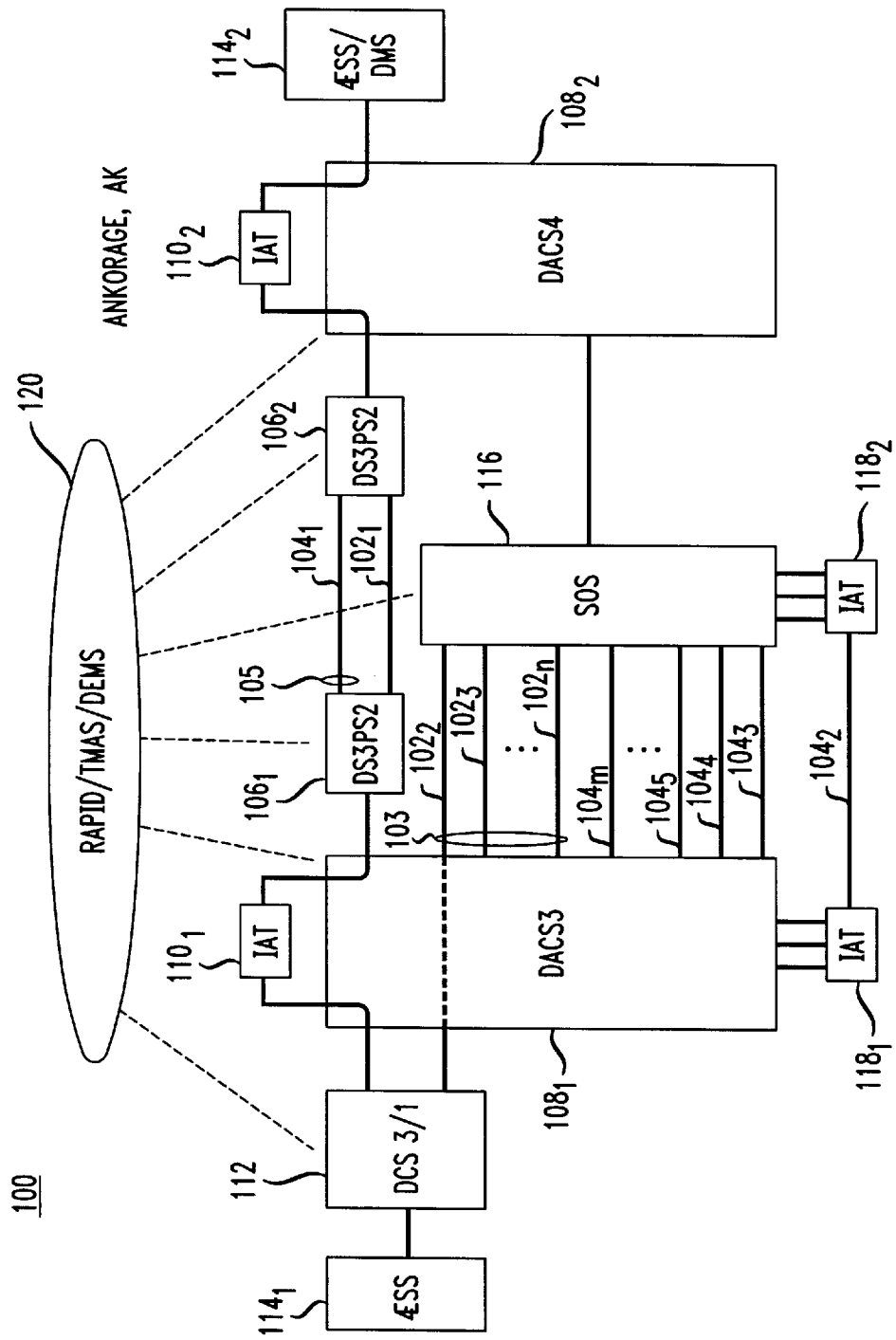
FIG. 2 is a block schematic diagram of the telecommunications network of the invention.

FIG. 2 depicts a telecommunications network 100 in accordance with the invention for providing timely restoration of traffic in the event a communication path in the network becomes unavailable. The network 100 includes a plurality of main communications channels $102_1 \ldots 102_n$, where n is an integer greater than 1. The main communications channels $102_1–102_n$, collectively comprise the channels of a first communications medium 103, such as an undersea cable. Additionally, the network includes a plurality of tertiary communications channels $104_1–104_m$, (where m is an integer greater than 1) that collectively comprise the channels of a second communications medium 105, such as a satellite (not shown).

At least the first tertiary channel $104_1$, and typically the remaining tertiary channels $104_2–104_m$ are active but are not normally employed to carry service traffic on a routine basis. Rather, the tertiary channels $104_1–104_m$ serve as restoration channels to carry traffic in the event that one or more of the main channels $102_1–102_n$, becomes unavailable, either because of a lack of transmission capacity, or as a result of a disruption caused by a cable break. Thus, the channels $104_1–104_m$, have the capability of carrying traffic even though they may remain idle as long as the main channels $102_1–102_n$ are active.

A first main communication channel $102_1$ and a first tertiary communication channel $104_1$ run parallel to each other between a first and second high-speed protection switching devices $106_1$ and $106_2$, each typically a digital signal protection switch, as is available in the art. Each of the switching devices $106_1$ and $106_2$ is coupled to one of Digital cross-connect devices (DACSs) $108_1$ and $108_2$. Each of the DACSs $108_1$ and $108_2$ routes the traffic received from, and passing to, a separate one of the protection switching devices $106_1$ and $106_2$ through a corresponding one of Integrated Access Terminals (IATs) $110_1$ and $110_2$, respectively. As with the IATs 29 and 36 of FIG. 1. the IATs 110 and $110_2$ of FIG. 2 provide 3:1 compression of signals transmitted to the corresponding protection switch, and 1:3 decompression of signals received from each protection switch, respectively.

The IAT $110_1$ is coupled via its corresponding DACS $108_1$ to a Digital Compression System (DCS) 112 that in turn, is coupled to a first telecommunications switch $114_1$, typically a No. 4ESS switch as are known in the art. Although not necessary to the operation of the network, it is desirable to employ the DCS 112 to provide 3:1compression of traffic transmitted from the switch, and 1:3 compression of traffic sent to the switch. The IAT $110_2$ is coupled via its corresponding DACS $108_2$ directly to a second telecommunications switch $114_2$, such as a No. 4ESS switch, formerly manufactured by AT&T, or a DMS switch manufactured by Nortel (formerly Northern Telcom). Although not necessary for the operation of the network 100, it nonetheless is desirable to employ the IATs $110_1$ and $110_2$ to effectively increase the traffic carrying capacity of the first main communication channel $102_1$ ands the first tertiary communications channel 104, The remaining channels $102_2–102_n$ of the main communications medium 103 run in parallel between the DACS $108_1$ and a Small Office Switch (SOS) 116, that may take the form of a digital cross-connect device or the like as are known in the art. Similarly, the tertiary channels $104_3–104_m$ of the tertiary communications medium 105 run in parallel with the main channels $102_2–102_n$ between the DACS $108_1$ and the SOS 116. A pair of IATs $118_1$ and $118_2$ couple the tertiary channel $104_2$ to the DACS $108_1$ and the SOS 116, respectively. Like the IATs $110_1$ and $110_2$, the IATs $118_1$ and $118_2$ provide compression and decompression for signals transmitted therefrom and received thereby, respectively. In practice, the SOS 116 is coupled to the switch $114_2$ through the DACS $108_2$ although a direct link between the SOS and the switch is possible.

A master controller 120, in the form of a processor, controls the DCS 112, the DACS $108_1$, the DACS $108_2$, the SOS 116 and the protection switching devices $106_1$ and $106_2$. The master controller 120 is responsive to status of both the main and tertiary communications media. In other words, the master controller 120 is responsive to the traffic on the channels $102_1–102_n$ and $104_1–104_m$. In the even that the main communications medium (e.g., the undersea cable) becomes unavailable, as a result of a disruption, the controller 120 immediately signals the protection switching devices $106_1$ and $106_2$ to route traffic from the first main channel $102_1$ to the first tertiary channel $104_1$. In this way, very rapid restoration of at least a portion of the traffic is achieved. In practice, the switching devices $104_1$ and $104_2$ can switch traffic almost instantaneously, far more quickly than the switching capability of the DACS $108_1$ and the SOS 116.

Should additional capacity be needed beyond that provided by the first tertiary channel $104_1$, then the master controller 120 signals the DACS $108_1$ and the SOS 116 to switch traffic from one or more of the remaining channels $102_2–102_n$ to one or more of the tertiary channels $104_2–104_m$. In practice, the DACS $108_1$ and the SOS 116 typically switch slower than the switching devices $106_1$ and $106_2$, so that full restoration (beyond the capacity of the first tertiary channel $104_1$) will take somewhat longer.

Unlike the network 10 of FIG. 1, restoration of a broken communications path within the network 100 is automatic, and is effected relatively rapidly. Moreover, all of the decision making for restoration is centralized within the processor 120, allowing for better supervision by the entity responsible for maintaining the network 100.

It is to be understood that the above-described embodiments are merely illustrative of the principles of the inven-

What is claimed is:

1. A network for providing rapid restoration of traffic in the event a path within the network becomes unavailable;
   a main communications medium comprised of a first main channel and a plurality of other main channels;
   a tertiary communications medium comprising a first tertiary channel and a plurality of other tertiary channels;
   first and second protection switching means linked by the first main channel and the first tertiary channel in parallel, the first and second protection switching means rapidly switching traffic from the first main channel to the first tertiary channel should the first main channel become unavailable to carry traffic;
   first and second digital cross-connect systems coupled to the first and second protection switching means, respectively, said first and second cross-connect systems also linked by the plurality of other main communications channels and the plurality of other tertiary communication channels in parallel, the first and second digital cross-connect systems cooperating to switch traffic from any of the plurality of other main communication channels to one of the plurality of other tertiary channels at a rate slower than the rate at which the first and second protection switches switch traffic should said any of the plurality of other main channels become unavailable; and
   a controller for controlling the first and second protection switching means and for controlling the first and second digital cross-connection systems for signaling the first and second protection switching means to switch traffic from the first main channel to the first tertiary channel and for subsequently signaling the first and second digital cross-connect systems to switch traffic from any of the plurality of other main communication channels to one of the plurality of other tertiary channels.

2. The network according to claim 1 wherein the main communications medium comprises an undersea cable.

3. The network according to claim 1 wherein the tertiary communications medium comprises a satellite.

4. The network according to claim 1 further including a first compression system coupled between the first switch and the first digital cross-connect system for compressing traffic transmitted from, and for decompressing traffic received by, the first switch.

5. The network according to claim 1 including a first and second integrated access terminals associated with the first and second protection switching means, respectively, the first and second integrated access terminals each compressing traffic transmitted to, and decompressing traffic transmitted from, the first and second protection switching means, respectively.

6. The network according to claim 1 wherein each of a pair of integrated access terminals couples opposite ends of one of the plurality of other tertiary communication channels to the first and second digital cross-connection systems, respectively.

7. The network according to claim 1 further including a third digital cross-connection system interposed between the second switch and the second digital cross-connect system and second protection switching means for connecting the second switch thereto.

8. The network according to claim 1 wherein the controller comprises a processor.

9. A network for providing rapid restoration of traffic in the event a path within the network becomes unavailable;
   a main communications medium comprised of a first main channel and a plurality of other main channels;
   a tertiary communications medium comprising a first tertiary channel and a plurality of other tertiary channels;
   first and second protection switching means linked by the first main channel and the first tertiary channel in parallel, the first and second protection switching means rapidly switching traffic from the first main channel to the first tertiary channel should the first main channel become unavailable to carry traffic;
   first and second digital cross-connect systems coupled to the first and second protection switching means, respectively, said first and second cross-connect systems also linked by the plurality of other main communications channels and the plurality of other tertiary communication channels in parallel, the first and second digital cross-connect systems cooperating to switch traffic from any of the plurality of other main communication channels to one of the plurality of other tertiary channels at a rate slower than the rate at which the first and second protection switches switch traffic should said any of the plurality of other main channels become unavailable;
   a first second switch for routing traffic to and from the first connect device
   a third digital cross-connect system coupled to the second protection switching means and the digital second cross-connect system;
   a second telecommunications switch for routing traffic to and from the third digital cross-connect system; and
   a controller for controlling the first and second protection switching means and for controlling the first, second, and third digital cross-connection systems for signaling the first and second protection switching means to switch traffic between the first main and first tertiary channels in the event either becomes unavailable and for subsequently signaling the first, second and third digital cross-connect systems to switch traffic between at least one of the plurality of other main communication channels and one of the plurality of other tertiary channels in the event that either becomes unavailable.

10. The network according to claim 9 wherein the main communications medium comprises an undersea cable.

11. The network according to claim 9 wherein the tertiary communications medium comprises a satellite.

12. The network according to claim 9 further including a first compression system coupled between the first switch and the first digital cross-connect system for compressing traffic transmitted from, and for decompressing traffic received by, the first switch.

13. The network according to claim 9 including a first and second integrated access terminals associated with the first and second protection switching means, respectively, the first and second integrated access terminals each compressing traffic transmitted to, and for decompressing traffic transmitted from, the first and second protection switching means, respectively.

14. The network according to claim 9 wherein each of a pair of integrated access terminals coupled opposite ends of one of the plurality of other tertiary communication channels to the first and second digital cross-connection systems, respectively.

15. A method for rapidly restoring traffic in a network, comprising the steps of:

providing a main communications medium comprised of a first main channel and a plurality of other main channels and providing a tertiary communications medium comprising a first tertiary channel and a plurality of other tertiary channels;

spanning first and second protection switching means with the first main channel and the first tertiary channel in parallel;

spanning a first and second digital cross-connect system with the plurality of other main communications channels and the plurality of other tertiary communications channels in parallel;

signaling the first and second protection switching means, via a controller responsive to the traffic carried by the first main and first tertiary communication channels, to switch traffic from the first main channel to the first tertiary channel when the first main channel is unavailable; and subsequently signaling the first and second cross-connect systems responsive to the traffic on the plurality of other main channels to switch traffic from any of the plurality of other main communication channels to one of the plurality of other tertiary channels at a rate slower than the rate at which the first and second protection switches switch traffic should any of the plurality of other main channels become unavailable.

* * * * *